US011294144B2

United States Patent
Huang (10) Patent No.: US 11,294,144 B2
(45) Date of Patent: Apr. 5, 2022

(54) LENS MODULE AND PROJECTION APPARATUS

(71) Applicant: Coretronic Corporation, Hsin-Chu (TW)

(72) Inventor: Shou-Cheng Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 124 days.

(21) Appl. No.: 16/845,090

(22) Filed: Apr. 10, 2020

(65) Prior Publication Data

US 2020/0326501 A1    Oct. 15, 2020

(30) Foreign Application Priority Data

Apr. 10, 2019   (CN) .......................... 201910283863.7

(51) Int. Cl.
*G02B 7/182*     (2021.01)
*G02B 7/02*      (2021.01)

(52) U.S. Cl.
CPC ........... *G02B 7/1822* (2013.01); *G02B 7/021* (2013.01)

(58) Field of Classification Search
CPC .......... G02B 7/02; G02B 7/023; G02B 7/003; G02B 7/021; G02B 7/08; G02B 7/022; G02B 7/025; G02B 6/4204; G02B 7/028; G02B 7/09; G02B 13/0085; G02B 7/004; G02B 7/04; G02B 7/14; G02B 7/005; G02B 13/001; G02B 13/004; G02B 13/0045; G02B 26/0875; G02B 3/00; G03B 3/10; G03B 13/36; G03B 17/12; G03B 17/14; G03B 21/142; G03B 2205/0069; G03B 2217/002; G03B 15/05; G03B 17/18;
(Continued)

(56) References Cited

U.S. PATENT DOCUMENTS

| 2002/0067552 A1* | 6/2002 | Tanabe | .................. | G02B 7/023 |
|---|---|---|---|---|
| | | | | 359/699 |
| 2005/0185152 A1* | 8/2005 | Velde | ..................... | G02B 7/023 |
| | | | | 353/101 |

(Continued)

FOREIGN PATENT DOCUMENTS

| CN | 1734305 | * | 2/2006 | ............... G02B 7/02 |
|---|---|---|---|---|
| CN | 101533209 B | | 2/2012 | |

(Continued)

*Primary Examiner* — William R Alexander
*Assistant Examiner* — Sharrief I Broome (57) ABSTRACT

A lens module includes a carrier, a framework, and an optical lens disposed on the framework. The carrier has an inner surface including a contact surface. The framework contacts the contact surface and is configured with a guiding lever disposed in a guiding recess formed across the inner surface. When the guiding lever is moved in the guiding recess, the framework is rotated on the carrier about an optical axis, and the framework and the optical are moved on the carrier along the optical axis. A projection apparatus includes an illumination system, a light valve, and a projection lens, and the illumination system includes the lens module. The lens module and the projection apparatus may be used to adjust the focusing position of the light beam passing through the optical lens to a proper position, and improve the projection quality of the projection apparatus.

20 Claims, 8 Drawing Sheets

(58) Field of Classification Search
CPC .... G03B 17/55; G03B 17/565; G03B 21/145; G03B 21/53; G03B 2205/00; G03B 2205/0061; G03B 2205/0076; G03B 2205/0084; G03B 2206/00; G03B 2215/0567; G03B 2215/0571; H04N 5/2254; H04N 5/2257; H04N 5/23212; H04N 17/002; H04N 1/02865; H04N 1/0303; H04N 1/10; H04N 1/1017; H04N 2201/02462; H04N 2201/02481; H04N 2201/02495; H04N 5/2252; H04N 5/22521; H04N 5/2256; H04N 5/23209; H04N 5/232123; H04N 5/23219; H04N 5/23222; H04N 5/23229; H04N 5/23245; B32B 2307/412; B32B 2551/00; B32B 2037/243; B32B 37/24; B32B 38/0008; B32B 2037/1253; B32B 2038/0076; B32B 2310/0831; B32B 2363/00; B32B 2398/00; B32B 37/0084; B32B 37/12; B32B 37/142; B32B 37/18; B32B 37/26; B32B 38/0004; H01L 2224/2919; H01L 2224/83121; H01L 2924/14; H01L 2924/00; H01L 2924/00014; H01L 2924/0665; H01L 2223/54426; H01L 2224/26175; H01L 2224/32225; H01L 2224/83143; H01L 2224/83192; H01L 2224/83234; H01L 2224/83385; H01L 2224/83862; H01L 23/345; H01L 23/544; H01L 24/29; H01L 24/32; H01L 24/83; H01L 27/14627

See application file for complete search history.

(56) References Cited

U.S. PATENT DOCUMENTS

| | | | |
|---|---|---|---|
| 2006/0291074 A1 | 12/2006 | Wang et al. | |
| 2008/0019027 A1 | 1/2008 | Lin et al. | |
| 2010/0202067 A1* | 8/2010 | Chen | F16M 11/045 359/822 |
| 2012/0154926 A1* | 6/2012 | Shinohara | G02B 15/10 359/672 |

FOREIGN PATENT DOCUMENTS

| | | | | |
|---|---|---|---|---|
| CN | 208537888 | * | 2/2019 | ............ G03B 21/14 |
| CN | 208537888 U | | 2/2019 | |
| CN | 209690692 U | | 11/2019 | |

* cited by examiner

LENS MODULE AND PROJECTION APPARATUS

CROSS-REFERENCE TO RELATED APPLICATION

This application claims the priority benefit of China application CN 201910283863.7, filed on Apr. 10, 2019. The entirety of the above-mentioned patent application is hereby incorporated by reference herein and made a part of this specification.

FIELD OF THE INVENTION

The invention relates to a lens module and a projection apparatus, and particularly relates to a lens module that simplifies adjusting the focusing position of a light beam and a projection apparatus including the lens module.

BACKGROUND OF THE INVENTION

In a projection apparatus, the distance between the focusing optical lens and the color wheel is a very important parameter that may critically affect the projection quality. Screws may be used with springs to fix the optical lens in the lens module. The optical lens may be moved to different positions and the distance between the optical lens and the color wheel may therefore be changed (i.e., different tightness of the screws and springs), such that the focusing position of the optical lens may be adjusted. However, the rotation and compression of the screw or spring may cause the displacement of the optical lens, which may result in a compromise in projection quality. In addition, in a conventional lens module, the optical lens is mounted on a ring-shaped framework, the ring-shaped framework is mounted on a carrier, and the ring-shaped framework fits closely to the carrier. Since the tolerance control is not easy, the contact surface of the ring-shaped framework or the carrier may be not even, resulting in difficult adjustment of the focusing position of the light beam.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a lens module, which simplifies the adjustment of the focusing position of a light beam and avoids the compromise of the projection quality of a projection apparatus.

The invention further provides a projection apparatus, a lens module of which simplifies the adjustment of the focusing position of a light beam and avoids the compromise of the projection quality of a projection apparatus.

Other advantages and objects of the invention may be further illustrated by the technical features broadly embodied and described as follows.

In order to achieve one or a portion of or all of the objects or other objects, an embodiment of the invention provides a lens module including a carrier, a framework, and an optical lens. The carrier has an inner surface. The inner surface includes a contact surface, and a guiding recess is formed across the inner surface. The framework contacts the contact surface and is configured with a guiding lever. The guiding lever is disposed in the guiding recess. The optical lens is disposed on the framework and has an optical axis. When the guiding lever is moved in the guiding recess, the framework is rotated on the carrier about the optical axis, and the framework and the optical lens are moved on the carrier along the optical axis.

In order to achieve one or a portion of or all of the objects or other objects, an embodiment of the invention provides a projection apparatus including an illumination system, a light valve, and a projection lens. The illumination system can provide an illumination beam. The light valve is disposed on a transmission path of the illumination beam to convert the illumination beam into an image beam. The projection lens is disposed on a transmission path of the image beam. The illumination system includes a light source device, a wavelength-converting device, and the above-mentioned lens module. The light source device can provide an excitation beam. The lens module is disposed on a transmission path of the excitation beam. The wavelength-converting device is disposed on the transmission path of the excitation beam and can convert the excitation beam passing through the optical lens into a converted beam. The illumination beam includes the excitation beam and the converted beam.

In the lens module and the projection apparatus of the invention, the guiding lever of the framework is movable in the guiding recess located across the inner surface of the carrier, so that the framework (the optical lens is disposed on the framework) is allowed to rotate on the carrier about the optical axis of the optical lens. Meanwhile, the framework and the optical lens can be moved on the carrier along the direction of the optical axis together, thereby adjusting the focusing position of the light beam passing through the optical lens to a proper position and improving the projection quality of the projection apparatus.

Other objectives, features and advantages of the invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
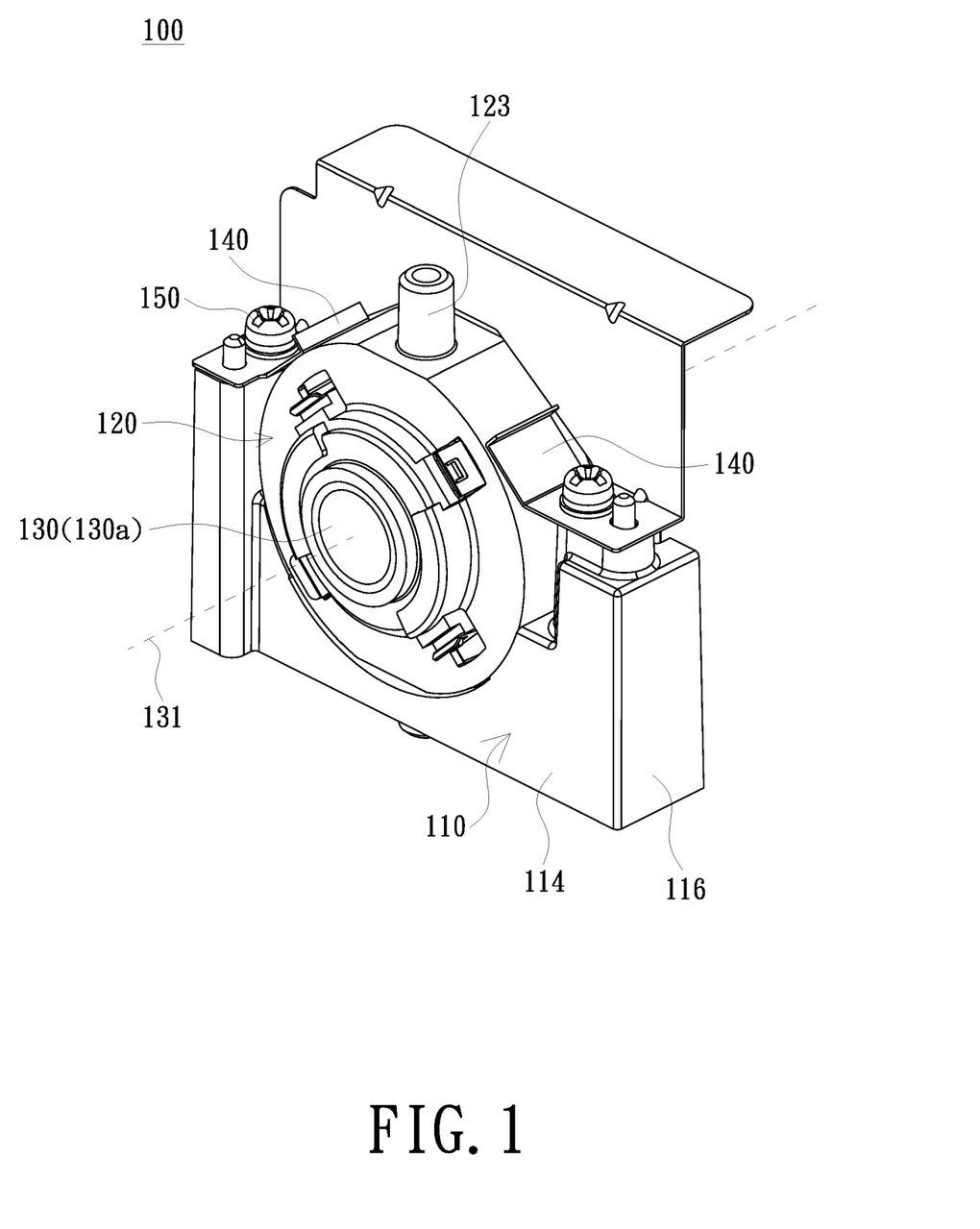
FIG. 1 is a schematic appearance view of a lens module according to an embodiment of the invention.
Figure 2:
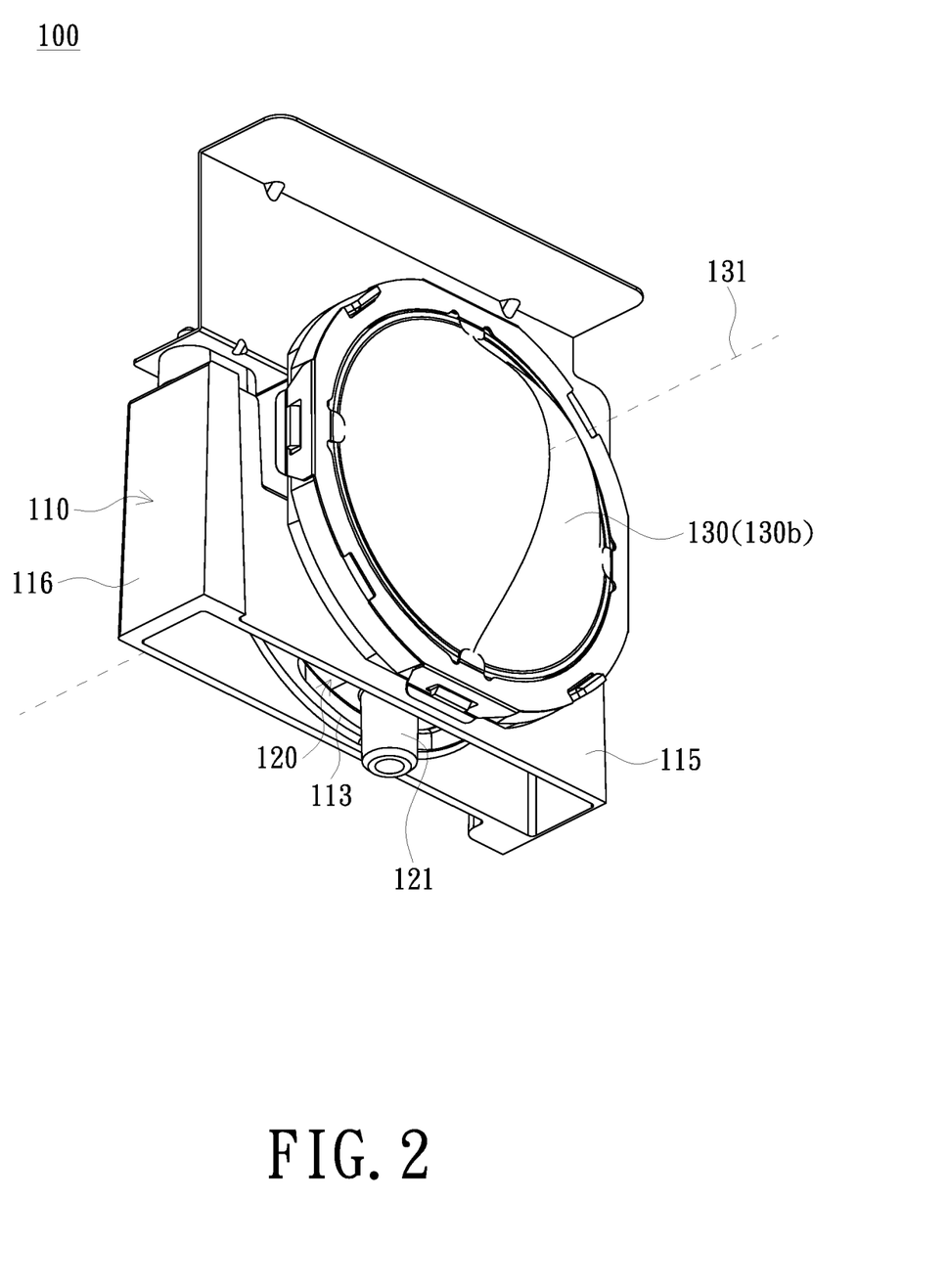
FIG. 2 is a schematic appearance view in another perspective of the lens module shown FIG. 1.
Figure 3:
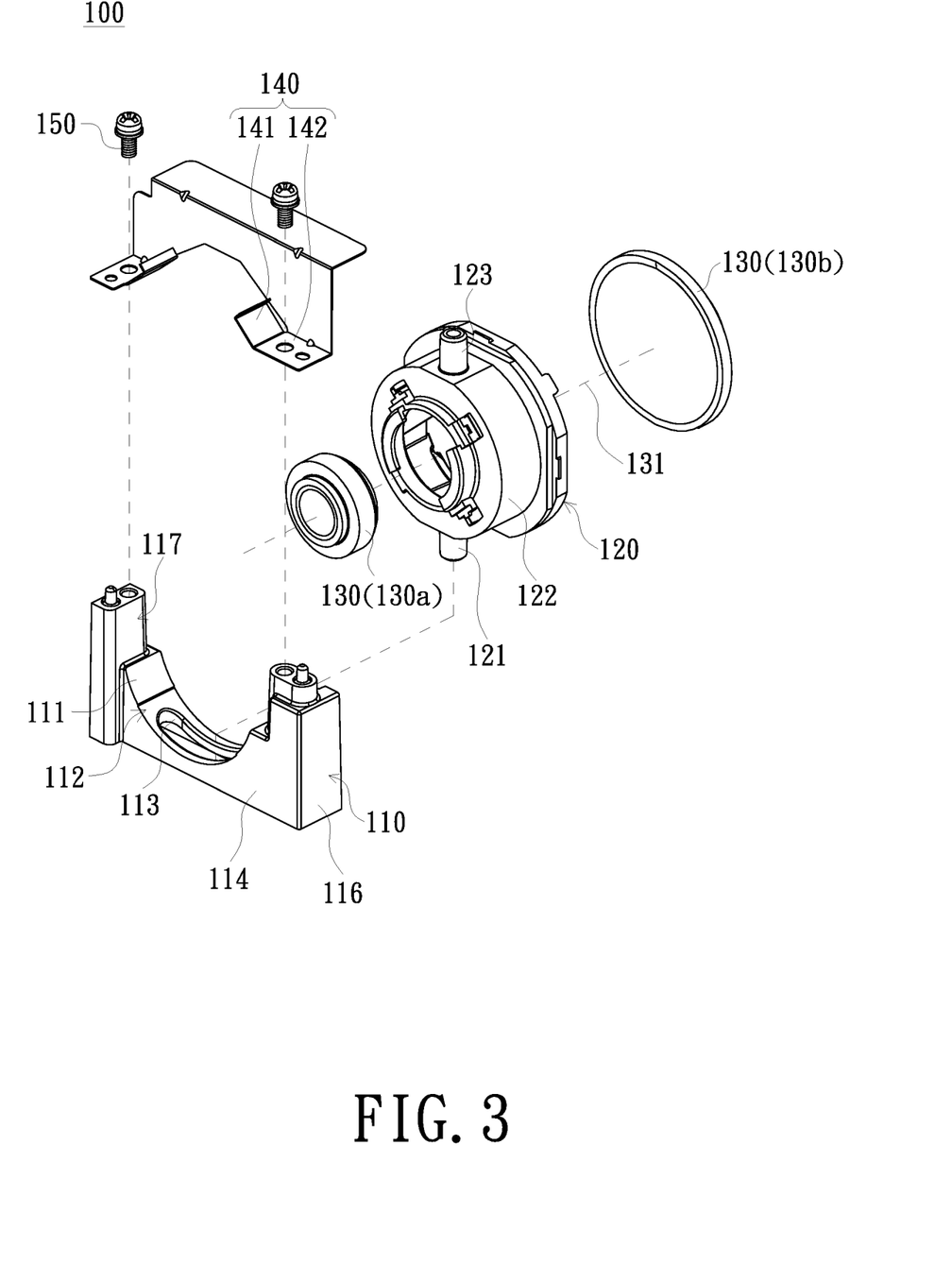
FIG. 3 is a schematic exploded view of the lens module shown FIG. 1.
Figure 4:
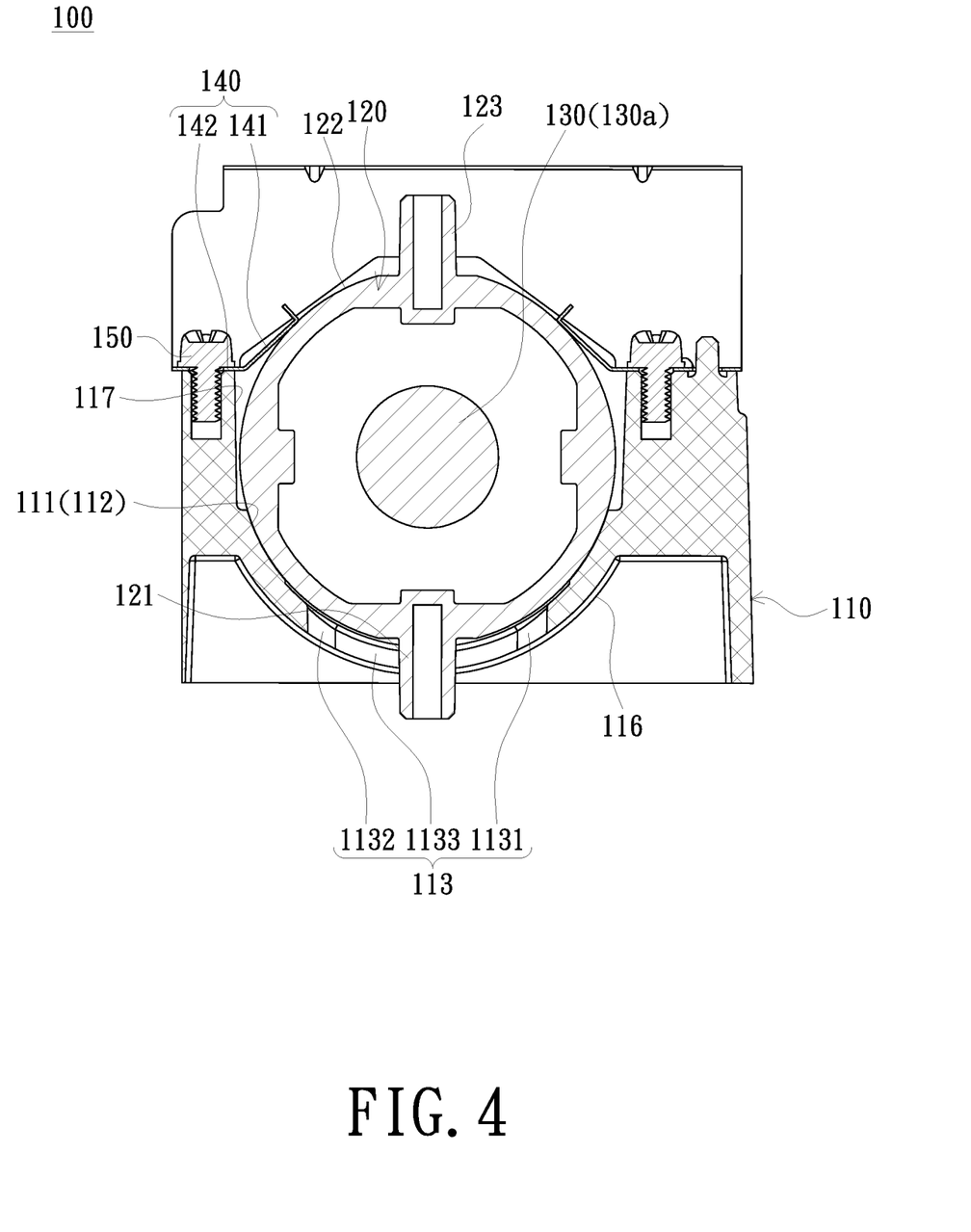
FIG. 4 is a schematic cross-sectional front view of the lens module shown FIG. 1.
Figure 5:
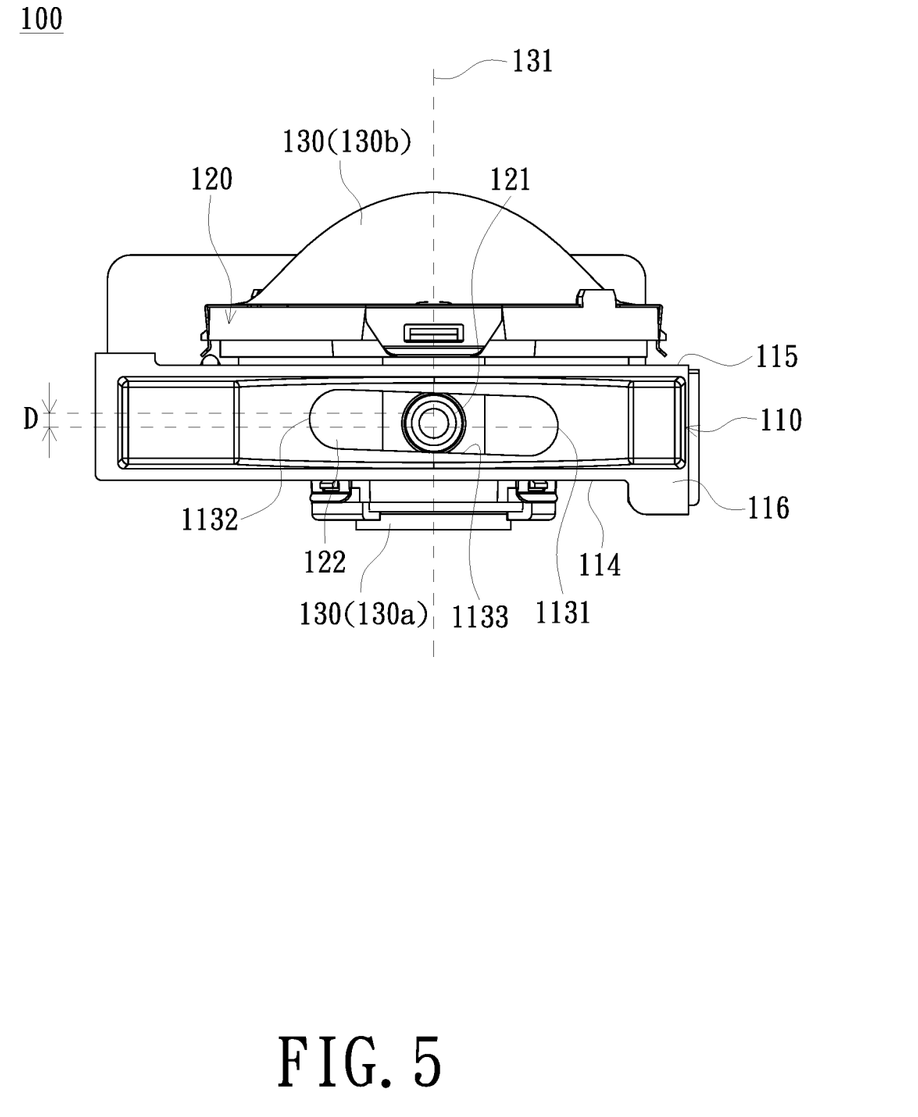
FIG. 5 is a schematic cross-sectional bottom view of the lens module shown FIG. 1.

FIG. 1 is a schematic appearance view of a lens module according to an embodiment of the invention. FIG. 2 is a schematic appearance view in another perspective of the lens module shown FIG. 1. FIG. 3 is a schematic exploded view of the lens module shown FIG. 1. FIG. 4 is a schematic cross-sectional front view of the lens module shown FIG. 1. FIG. 5 is a schematic cross-sectional bottom view of the lens module shown FIG. 1. Referring to FIGS. 1 to 5, the lens module 100 of the embodiment includes a carrier 110, a framework 120, and an optical lens 130. The carrier 110 has an inner surface 111. The inner surface 111 has a contact surface 112, and a guiding recess 113 is formed across the inner surface 111. The framework 120 is in contact with the contact surface 112 and is configured with a guiding lever 121. The guiding lever 121 is disposed in the guiding recess 113. The optical lens 130 is disposed on the framework 120 and has an optical axis 131. When the guiding lever 121 is moved in the guiding recess 113, the framework 120 is rotated on the carrier 110 about the optical axis 131, and the framework 120 and the optical lens 130 are moved on the carrier 110 along the optical axis 131, so as to change the focusing position of the light beam passing through the optical lens 130. In the embodiment, the optical lens 130 may be, for example, a focusing lens, but the invention is not limited thereto. Also, the number of the optical lens 130 may be single one or more, for example, two optical lenses 130a, 130b. In addition, the framework 120 may be ring-shaped, and the shape of the contact surface 112 may be matched with the shape of the peripheral surface 122 of the framework 120. In the embodiment, the contact surface 112 is arc-shaped, and the peripheral surface 122 of the framework 120 is arc-shaped, but the invention is not limited thereto.

In an embodiment, the lens module 100 may further comprise a resilient sheet 140. The resilient sheet 140 is disposed on the carrier 110 and is configured for contacting the framework 120. The resilient sheet 140 can force the framework 120 tightly against the contact surface 112 by means of elasticity, so that the framework 120 may be firmly mounted on the contact surface 112. In the embodiment, the resilient sheet 140 comprises a free end 141 and a fixed end 142. The free end 141 may be disposed against the framework 120. Specifically, the free end 141 of the resilient sheet 140 may be disposed against the peripheral surface 122 of the framework 120. The fixed end 142 may be fixed on the carrier 110. However, in other embodiments, the free end 141 may be disposed against the inner surface 111 of the carrier 110, and the fixed end 142 may be fixed on the framework 120. In the embodiment shown in FIG. 3, the fixed end 142 of the resilient sheet 140 may be fixed onto the carrier 110 by a fixing member 150, such as a screw. In addition, the number of the resilient sheet 140 may be one or more. The number of the contact surface 112 may be one or more. In the embodiment, the number of the resilient sheet 140 and the number of the contact surface 112 are the same, for example, the number of the resilient sheet 140 and the number of the contact surface 112 are two, and the two resilient sheets 140 are used for contacting two opposite sides of the framework 120, but the invention is not limited thereto. In other embodiments, the number of the resilient sheet 140 and the number of the contact surface 112 may be different, for example, the number of the resilient sheet 140 may be one and the number of the contact surface 112 may be two. Further, in the embodiment, the guiding recess 113 is disposed between the two contact surfaces 112, but the invention is not limited thereto.

In an embodiment, the carrier 110 may further have a first side surface 114 and a second side surface 115. The first side surface 114 and the second side surface 115 are arranged along the optical axis 131. The inner surface 111 is connected between the first side surface 114 and the second side surface 115, and the guiding recess 113 extends obliquely between the first side surface 114 and the second side surface 115. In other words, the extension direction of the guiding recess 113 is not vertical to the optical axis 131. In the embodiment, the guiding recess 113 comprises a first end 1131, a second end 1132 and a connecting section 1133. The connecting section 1133 connects the first end 1131 and the second end 1132 obliquely. The first end 1131 is closer to the first side surface 114 than the second end 1132 is, and the second end 1132 is closer to the second side surface 115 than the first end 1131 is. When the guiding lever 121 is moved in the guiding recess 113 from the first end 1131 toward the second end 1132 via the connecting section 1133, the framework 120 is rotated on the carrier 110 about the optical axis 1131, and the framework 120 and the optical lens 130 are moved on the carrier 110 from the first side surface 114 toward the second side surface 115. On the contrary, when the guiding lever 121 is moved in the guiding recess 113 from the second end 1132 toward the first end 1131 via the connecting section 1133, the framework 120 is rotated on the carrier 110 about the optical axis 1131, and the framework 120 and the optical lens 130 are moved on the carrier 110 from second side surface 115 toward the first side surface 114. In addition, in the embodiment, a distance D between a projection point of the first end 1131 on the optical axis 131 and a projection point of the second end 1132 on the optical axis 131 may be, for example, 0.6 mm to 0.7 mm, but the invention is not limited thereto.

In an embodiment, the framework 120 may further include an adjustment lever 123. In the embodiment, the guiding lever may extend toward a first direction away from the optical axis 131, and the adjustment lever 123 may extend toward a second direction away from the optical axis 131. The first direction and the second direction are different. When the adjustment lever 123 is pushed, the guiding lever 121 is moved between the first end 1131 and the second end 1132 of the guiding recess 113, the framework 120 is rotated on the carrier 110 about the optical axis 131, and the framework 120 and the optical lens 130 is moved on the carrier 110 along the direction of the optical axis 131. In other words, users can adjust the focusing position of the light beam passing through the optical lens 130 by means of pushing the adjustment lever 123. Compared to screws, a torque may be more easily applied to the adjustment lever 123, so as to rotate the framework 120, making adjustment easier. In addition, in the embodiment, the carrier 110 may further have an outer surface 116. The outer surface 116 is located at a side of the inner surface 111 away from the optical axis 131. The carrier 110 further has an adjustment opening 117. The adjustment opening 117 passes through the inner surface 111 and the outer surface 116, and the adjustment lever 123 may be disposed in the adjustment opening 117. The guiding recess 113 may concaves from the inner surface 111 toward the outer surface 116. In an embodiment, the guiding recess 113 may be a non-penetrated hole, or may be a through hole penetrating the inner surface 111 and the outer surface 116. Specifically, in the embodiment, the guiding recess 113 may be a through hole formed across the inner surface 111 and penetrating through the outer surface 116. However, in other embodiments, the guiding recess 113 may be a non-penetrated hole formed across the inner surface 111 and not penetrating through the outer surface 116. When the guiding recess 113 is the non-penetrated hole, with the configuration of the adjustment lever 123, the position of the guiding lever 121 in the guiding recess 113 can be adjusted conveniently, so that the framework 120 and the optical lens 130 are moved on the carrier 110 along the direction of the optical axis 131, and thereby adjusting the focusing position of the light beam passing through the optical lens 130. When the guiding recess 113 is the through hole, the focusing position of the light beam passing through the optical lens 130 may be adjusted as required by adjusting the position of the guiding lever 121 in the guiding recess 113 directly, or by adjusting the position of the guiding lever 121 in the guiding recess 113 by using the adjustment lever 123. Therefore, with the configuration of the adjustment lever 123 or/and with the guiding recess 113 configured as a through hole, the focusing position of the light beam passing through the optical lens 130 can be adjusted conveniently.

In the embodiment, the adjustment lever 123 extends over the adjustment opening 117 and to the outside of the outer surface 116. That is, the adjustment lever 123 protrudes out of the outer surface 116. By means of that, the position of the optical lens 130 can be adjusted conveniently for adjustment of the focusing position of the light beam passing through the optical lens 130. In other embodiments, in the embodiment that the guiding recess 113 is the through hole and the lens module 110 is configured with no adjustment lever 123, the focusing position of the light beam can be adjusted directly by adjusting the position of the guiding lever 121 in the guiding recess 113. In other words, the guiding lever 121 can serve as the adjustment lever.

In the lens module 100, since the guiding recess 113 is formed across the inner surface 111 of the carrier 110, the framework 120 is configured with the adjustment lever 121 disposed in the guiding recess 113, and the guiding recess 113 extends between the first side surface 114 and the second side surface 115 of the carrier 110 obliquely, when the framework 120 is disposed to be in contact with the contact surface 112 of the inner surface 111, the framework 120 can be rotated on the carrier 110 about the optical axis 131 of the optical lens 130 (the optical lens 130 is disposed on the framework 120) by adjusting the position of the guiding lever 121 in the guiding recess 113. Meanwhile, the framework 120 and the optical lens 130 can be moved together on the carrier 110 along the direction of the optical axis 131, for example, the framework 120 can be pushed forward or backward, so as to change the distance between the optical lens 130 fixed on the framework 120 and a wavelength-converting device, and thereby achieving the adjustment of the focusing position of the light beam. It can be seen that by the configuration of the guiding recess 131 and the guiding lever 121, the focusing position of the light beam passing through the optical lens 130 can be adjusted such that it may focus at a location near the wavelength-converting device (for example, a color wheel), so as to avoid compromise of the projection quality of the projection apparatus.

In the lens module 100 of the embodiment, after the optical lens 130 is disposed on the contact surface 112 of the beating seat 110 with the framework 120, the framework 120 may be disposed against the contact surface 112 of the inner surface 111 by the elasticity of the resilient sheet 140. In the embodiment, the framework 120 is fixed onto the carrier 110 not by screws. In the embodiment of the invention, screws are not used in the fixing of the framework 120, thereby avoiding displacement between the optical lens 130 and the framework 120 caused from the rotation and compression of the screw. Additionally, the cost may also be effectively reduced without screws or with fewer screws. A resilient sheet 140 with smaller elastic modulus may be selected according to the requirement, or the tightness of the fixing member 150 used for fixing the resilient sheet 140 may be adjusted according to the requirement, so as to change the elastic force applied by the resilient sheet 140 to the framework 120, and thereby changing the frictional force generated between the framework 120 and the contact surface 112 when adjusting the optical lens 130. In addition, an excessive tightness or an insufficient tightness for the lens module 100 may be avoided, so that the framework 120 may be kept on the contact surface 112 and be rotated and moved relative to the contact surface 112 during the adjustment of the optical lens 130. The contact/laminate area between the framework 120 and the inner surface 111, that is, the area of the contact surface 112, should be large enough to support and fix the resilient sheet 140. That is, the area of the contact surface 112 can be appropriate reduced, so that the shaking during assembling can be effectively improved.

Figure 6:
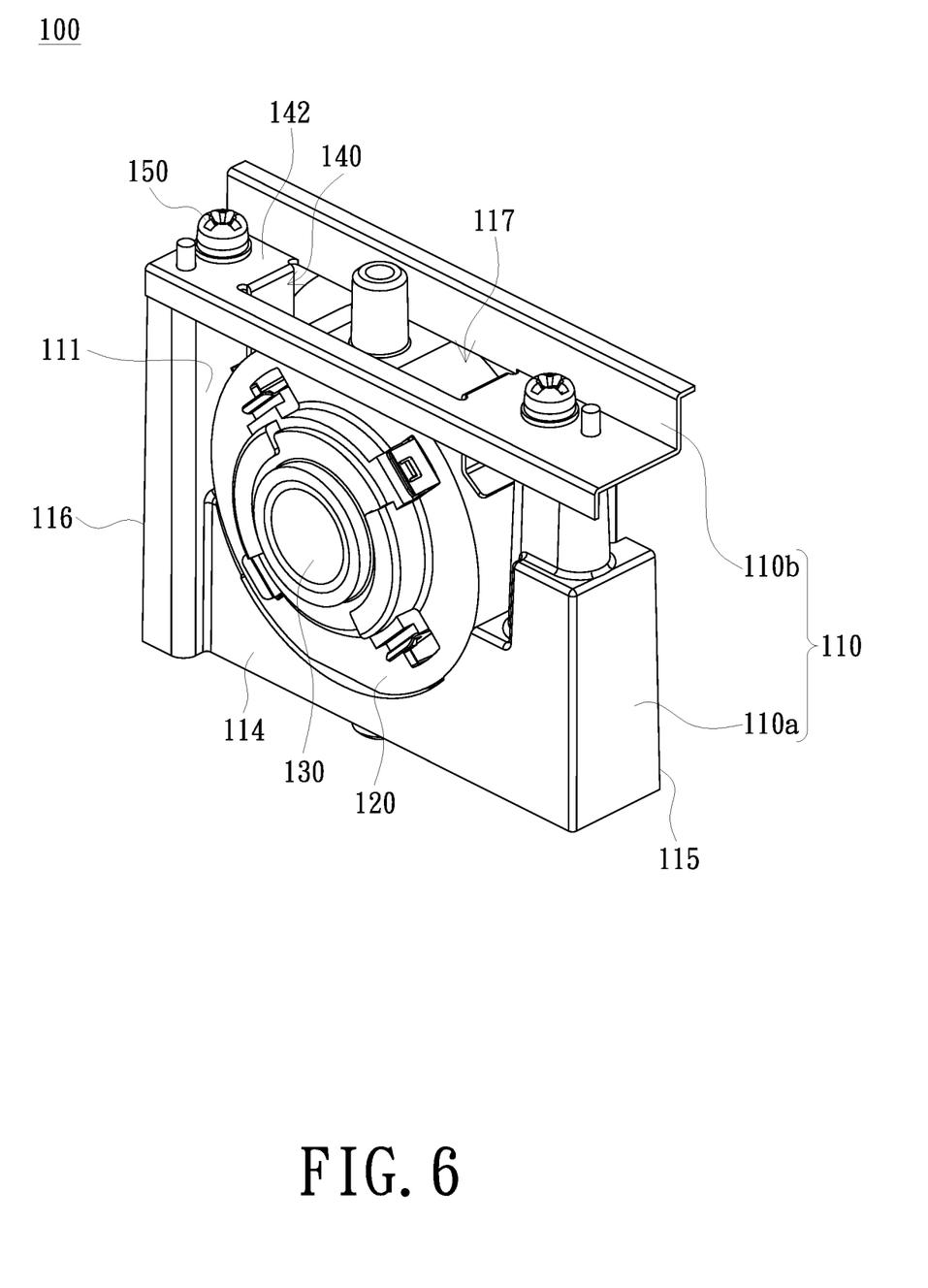
FIG. 6 is a schematic appearance view of a lens module according to another embodiment of the invention.
Figure 7:
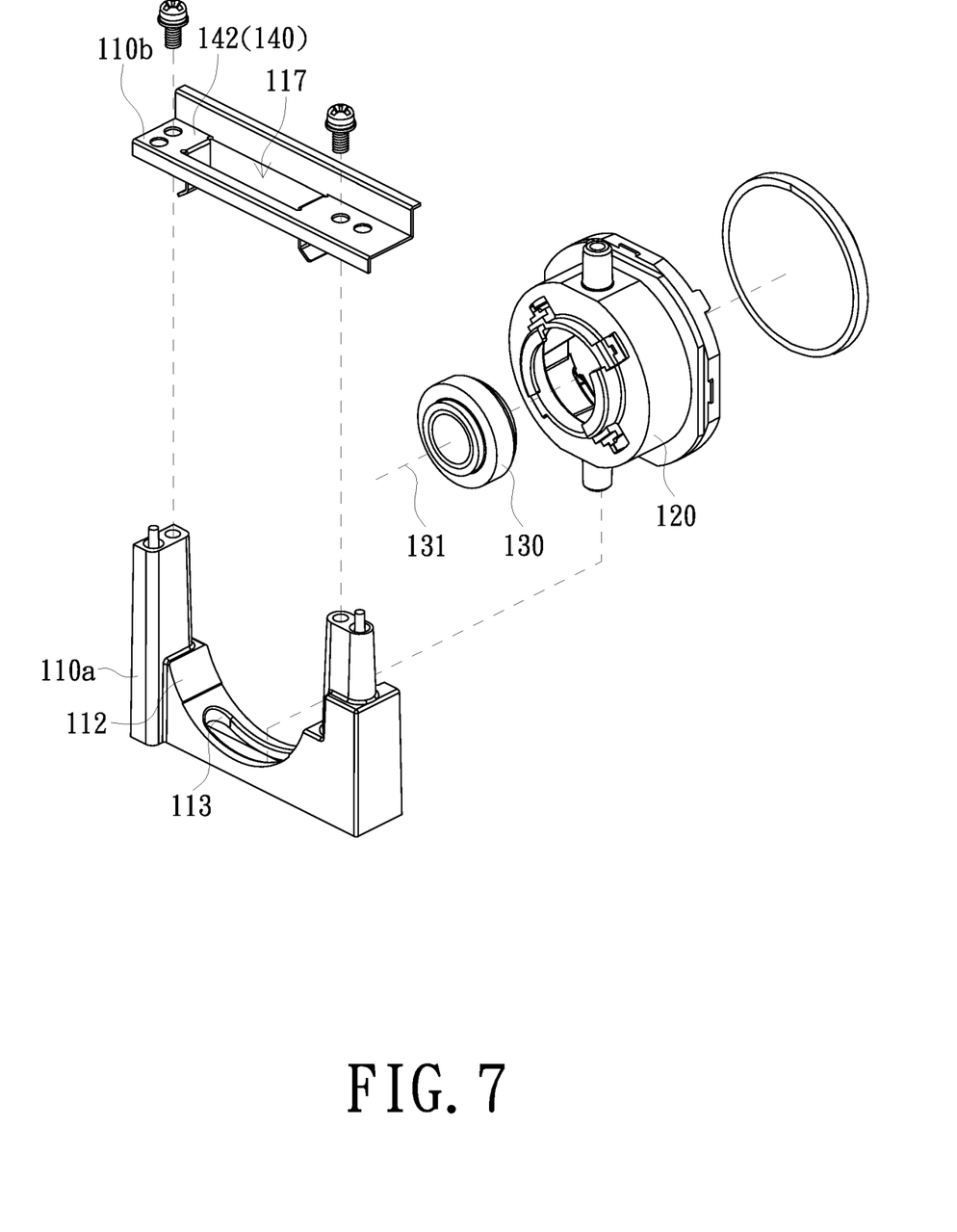
FIG. 7 is a schematic exploded view of the lens module shown in FIG. 6.

FIG. 6 is a schematic appearance view of a lens module according to another embodiment of the invention. FIG. 7 is a schematic exploded view of the lens module shown in FIG. 6. Referring to FIGS. 6 and 7, in the lens module 100 of the embodiment, the carrier 100 further includes a bottom base 110a and a top cover 110b. The top cover 110b is disposed on the bottom base 110a. The internal surface of the top cover 110b and the internal surface of the bottom base 110a are connected to form the inner surface 111, and the external surface of the top cover 110b and the external surface of the bottom base 110a are connected to form the outer surface 116. The contact surface 112 can be a portion of the internal surface of the bottom base 110a, and the guiding recess 113 is formed in the bottom base 110a. The framework 120 and the optical lens 130 are disposed between the bottom base 110a and the top cover 110b. The top cover 110b is fixed onto the bottom base 110a by using a fixing member 150, and the fixed end 142 of the resilient sheet 140 may be connected to the top cover 110b. Furthermore, in the embodiment, the resilient sheet 140 and the top cover 110b are formed as one single piece, but the invention is not limited thereto. In other embodiments, the resilient sheet 140 and the top cover 110b can be separate pieces. The fixed end 142 of the resilient sheet 140 can be fixed onto the bottom base 110a by using the fixing member 150 or another fixing member. In addition, in the embodiment, the guiding recess 113 can be disposed at the bottom of the bottom base 110a. When the guiding recess 113 is a through hole, the guiding recess 113 may penetrate through the bottom of the bottom base 110a, and the adjustment opening 117 can be formed on the top cover 110b, but the invention is not limited thereto. In other embodiments, the guiding recess 113 can also be disposed at the side of the top cover 110b or the side of the bottom base 110a. The adjustment opening 117 can also be disposed at the bottom base 110a, or can also be disposed the side of the top cover 110b or the side of the bottom base 110a.

Figure 8:
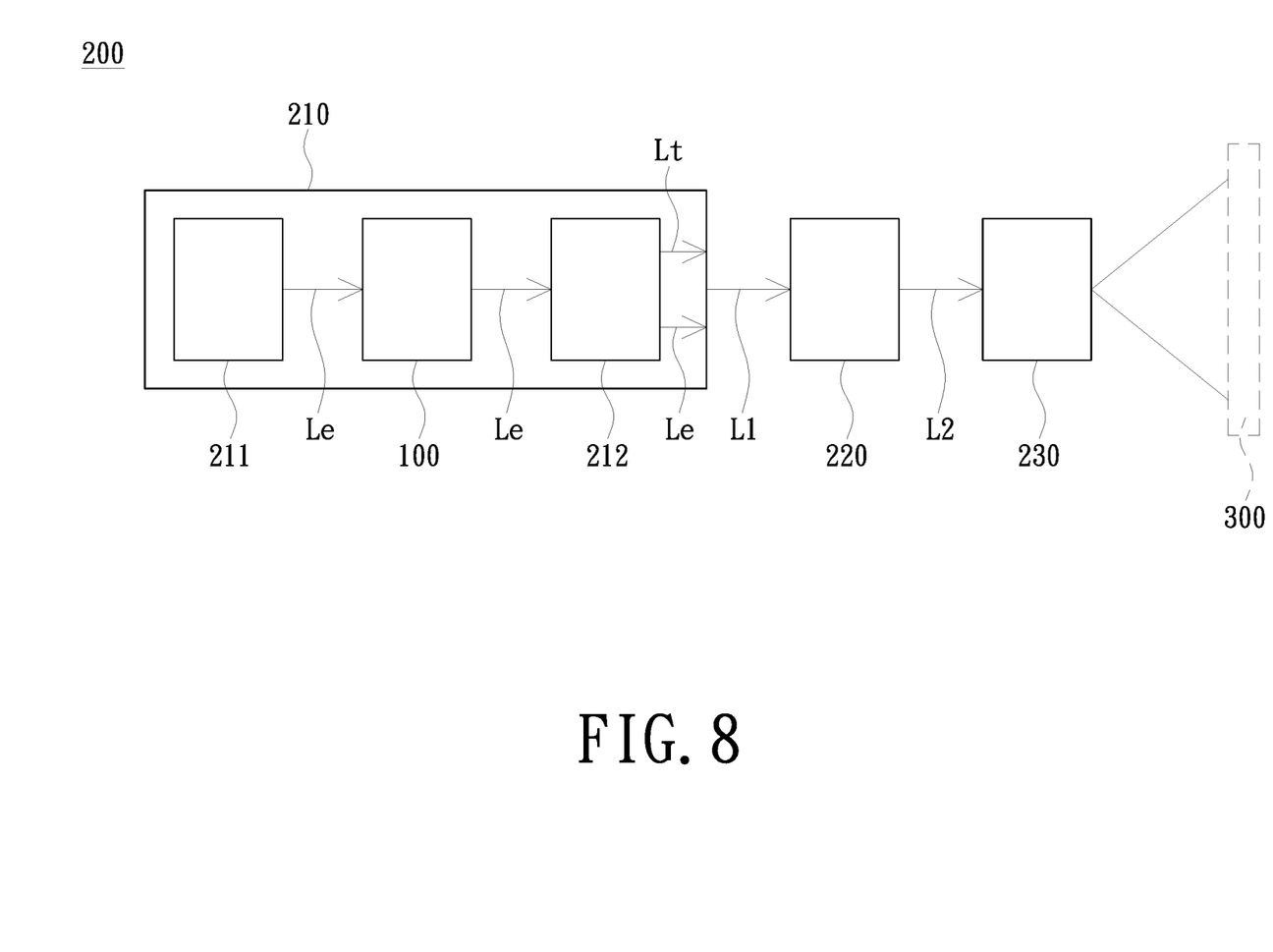
FIG. 8 a schematic block diagram of a projection apparatus according to an embodiment of the invention.

FIG. 8 a schematic block diagram of a projection apparatus according to an embodiment of the invention. Referring to FIGS. 1 and 8, the projection apparatus (for example, a projector) 200 of the embodiment includes an illumination system 210, a light valve 220, and a projection lens 230. The illumination system 210 can provide an illumination beam L1. The light valve 220 is disposed on a transmission path of the illumination beam L1 to convert the illumination beam L1 into an image beam L2. The projection lens 230 is disposed on a transmission path of the image beam L2 to project the image beam L2 onto a screen 300, so as to form an image on the screen 300. The light valve 220 may include a transmissive light valve or a reflective light valve. The transmissive light valve may include a transmissive liquid crystal panel, and the reflective light valve may include a digital micro-mirror device (DMD) or a liquid crystal on silicon panel (LCOS panel), but the invention is not limited thereto. The projection lens 230 may include, for example, one or a combination of a plurality of optical lenses having diopter, such as a various combinations of non-planar lenses including biconcave lens, biconvex lenses, concavo-convex lenses, convexo-concave lenses, plano-convex lenses, and plano-concave lenses. In an embodiment, the projection lens 230 may also include a planar optical lens.

In an embodiment, the illumination system 210 includes a light source device 211, the lens module 100, and a wavelength-converting device 212. The light source device 211 can provide an excitation beam Le. The lens module 100 and the wavelength-converting device 212 are disposed on a transmission path of the excitation beam Le. The wavelength-converting device 212 is configured to convert the excitation beam Le passing through the optical lens 130 of the lens module 100 into a converted beam Lt, and allow the excitation beam Le to pass through according to time sequence. The illumination beam L1 includes the excitation beam Le and the converted beam Lt. The light source device 211 includes, for example, a diode module including a light-emitting diode or a laser diode (LD), or a diode module bank array composed of a plurality of diode modules, but the invention is not limited thereto. The wavelength-converting device includes, for example, a wavelength-converting wheel, but the invention is not limited thereto. In addition, the illumination system 210 can further include other optical members, such as a light combination member a filter wheel, a light homogenizing member, and the like, to transmit the illumination beam L1 to the light valve 220. Although FIG. 8 illustrates the lens module 100 in FIG. 1 as an example, the lens module 100 can be replaced with the lens module 100 of any one of the above-mentioned embodiments.

To sum up, in the lens module and the projection apparatus of the invention, by adjusting the position of the guiding lever of the framework in the guiding recess the carrier, the framework is rotated on the carrier about the optical axis of the optical lens. Meanwhile, the framework and the optical lens can be moved on the carrier along the direction of the optical axis together. Therefore, the focusing position of the light beam passing through the optical lens can be adjusted such that it may focus at a location near the wavelength-converting device, so as to improve the projection quality of the projection apparatus.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as first side surface, second side surface, first direction, second direction, first end, second end, and so on, are only used for distinguishing various elements and do not limit the number of the elements.

What is claimed is:

1. A lens module, comprising a carrier, a framework, and an optical lens, wherein:
   the carrier has an inner surface, the inner surface includes a contact surface, and a guiding recess is formed across the inner surface;
   the framework contacts the contact surface and is configured with a guiding lever, and the guiding lever is disposed in the guiding recess;
   the optical lens is disposed on the framework and has an optical axis;
   when the guiding lever is moved in the guiding recess, the framework is rotated on the carrier about the optical axis, and the framework and the optical lens are moved on the carrier along the optical axis;
   wherein the guiding recess comprises a first end, a second end, and a connecting section, the connecting section obliquely connects the first end and the second end, and a distance between a projection point of the first end on the optical axis and a projection point of the second end on the optical axis is 0.6 mm to 0.7 mm.

2. The lens module of claim 1, wherein the lens module further comprises at least one resilient sheet, the at least one resilient sheet is disposed on the carrier and is configured for contacting the framework.

3. The lens module of claim 2, wherein each of the at least one resilient comprises a free end and a fixed end, the fixed end is disposed on the carrier, and the free end is disposed against the framework.

4. The lens module of claim 1, wherein the carrier further has a first side surface and a second side surface arranged along the optical axis, the inner surface is connected between the first side surface and the second side surface, and the guiding recess extends obliquely between the first side surface and the second side surface.

5. The lens module of claim 1, wherein the guiding lever extends toward a first direction away from the optical axis.

6. The lens module of claim 5, wherein the framework further is configured with an adjustment lever, the adjustment lever extends toward a second direction away from the optical axis, and the second direction is different from the first direction.

7. The lens module of claim 6, wherein the carrier further has an outer surface, the outer surface is located at a side of the inner surface away from the optical axis, and the carrier further has an adjustment opening, the adjustment opening passes through the inner surface and the outer surface, and the adjustment lever is disposed in the adjustment opening.

8. The lens module of claim 1, wherein the carrier further has an outer surface, the outer surface is located at a side of the inner surface away from the optical axis, and the guiding recess concaves from the inner surface toward the outer surface.

9. The lens module of claim 8, wherein the guiding recess is a through hole penetrating the inner surface and the outer surface.

10. The lens module of claim 1, wherein the carrier further comprises a bottom base and a top cover, the top cover is disposed on the bottom base, the inner surface comprises an internal surface of the bottom base and an internal surface of the top cover, the contact surface is a portion of the internal surface of the bottom base and the guiding recess is formed in the bottom base, the framework and the optical lens are disposed between the bottom base and the top cover.

11. A projection apparatus, comprising an illumination system, a light valve, and a projection lens, the illumination system providing an illumination beam, the light valve disposed on a transmission path of the illumination beam to convert the illumination beam into an image beam, the projection lens disposed on a transmission path of the image beam, the illumination system comprising a light source device, a lens module, and a wavelength-converting device, wherein:
   the light source device provides an excitation beam;
   the lens module is disposed on a transmission path of the excitation beam, the lens module comprises a carrier, a framework, and an optical lens, the carrier has an inner surface, the inner surface includes a contact surface, and a guiding recess is formed across the inner surface, the framework contacts the contact surface and is configured with a guiding lever, the guiding lever is disposed in the guiding recess, the optical lens is disposed on the framework and has an optical axis, when the guiding lever is moved in the guiding recess, the framework is rotated on the carrier about the optical axis, and the framework and the optical lens are moved on the carrier along the optical axis;
   the wavelength-converting device is disposed on the transmission path of the excitation beam to convert the excitation beam passing through the optical lens into a converted beam, and the illumination beam comprises the excitation beam and the converted beam;
   wherein the guiding recess has a first end, a second end, and a connecting section, the connecting section obliquely connects the first end and the second end, and a distance between a projection point of the first end on the optical axis and a projection point of the second end on the optical axis is 0.6 mm to 0.7 mm.

12. The projection apparatus of claim 11, wherein the lens module further comprises at least one resilient sheet, the at least one resilient sheet is disposed on the carrier and is configured for contacting the framework.

13. The projection apparatus of claim 12, wherein each of the at least one resilient comprises a free end and a fixed end, the fixed end is disposed on the carrier, and the free end is disposed against the framework.

14. The projection apparatus of claim 11, wherein the carrier further has a first side surface and a second side surface arranged along the optical axis, the inner surface is connected between the first side surface and the second side surface, and the guiding recess extends obliquely between the first side surface and the second side surface.

15. The projection apparatus of claim 11, wherein the guiding lever extends toward a first direction away from the optical axis.

16. The projection apparatus of claim 15, wherein the framework further is configured with an adjustment lever, the adjustment lever extends toward a second direction away from the optical axis, and the second direction is different from the first direction.

17. The projection apparatus of claim 16, wherein the carrier further has an outer surface, the outer surface is located at a side of the inner surface away from the optical axis, and the carrier further has an adjustment opening, the adjustment opening passes through the inner surface and the outer surface, and the adjustment lever is disposed in the adjustment opening.

18. The projection apparatus of claim 11, wherein the carrier further has an outer surface, the outer surface is located at a side of the inner surface away from the optical axis, and the guiding recess concaves from the inner surface toward the outer surface.

19. The projection apparatus of claim 18, wherein the guiding recess is a through hole penetrating the inner surface and the outer surface.

20. The projection apparatus of claim 11, wherein the carrier further comprises a bottom base and a top cover, the top cover is disposed on the bottom base, the inner surface comprises an internal surface of the bottom base and an internal surface of the top cover, the contact surface is a portion of the internal surface of the bottom base and the guiding recess is formed in the bottom base, the framework and the optical lens are disposed between the bottom base and the top cover.

* * * * *